(12) United States Patent
Okamura

(10) Patent No.: US 11,534,723 B2
(45) Date of Patent: Dec. 27, 2022

(54) METHOD OF FILTRATION USING POROUS MEMBRANES

(71) Applicant: ASAHI KASEI KABUSHIKI KAISHA, Tokyo (JP)

(72) Inventor: Daisuke Okamura, Tokyo (JP)

(73) Assignee: ASAHI KASEI KABUSHIKI KAISHA, Tokyo (JP)

(*) Notice: Subject to any disclaimer, the term of this patent is extended or adjusted under 35 U.S.C. 154(b) by 100 days.

(21) Appl. No.: 16/642,218

(22) PCT Filed: Sep. 4, 2018

(86) PCT No.: PCT/JP2018/032737
§ 371 (c)(1),
(2) Date: Feb. 26, 2020

(87) PCT Pub. No.: WO2019/049858
PCT Pub. Date: Mar. 14, 2019

(65) Prior Publication Data
US 2020/0353420 A1    Nov. 12, 2020

(30) Foreign Application Priority Data
Sep. 7, 2017 (JP) ............................. JP2017-171800

(51) Int. Cl.
*B01D 65/02* (2006.01)
*B01D 69/08* (2006.01)
(Continued)

(52) U.S. Cl.
CPC ............. *B01D 65/02* (2013.01); *B01D 69/08* (2013.01); *B01D 71/34* (2013.01); *B01D 71/36* (2013.01);
(Continued)

(58) Field of Classification Search
None
See application file for complete search history.

(56) References Cited

U.S. PATENT DOCUMENTS

| 4,844,809 A * | 7/1989 | Yoshiro ................. B01D 61/14 |
| | | 210/636 |
| 6,322,703 B1 * | 11/2001 | Taniguchi ............ B01D 63/025 |
| | | 210/636 |

(Continued)

FOREIGN PATENT DOCUMENTS

| CN | 102527250 A | 7/2012 |
| CN | 102764597 A | 11/2012 |

(Continued)

OTHER PUBLICATIONS

International Search Report issued in International Application No. PCT/JP2018/032737 and English language translation thereof, dated Dec. 4, 2018.

(Continued)

*Primary Examiner* — Jason M Greene
*Assistant Examiner* — Eric J McCullough
(74) *Attorney, Agent, or Firm* — Greenblum & Bernstein, P.L.C.

(57) ABSTRACT

A filtration method that includes a cleaning step using a chemical agent, wherein provided is the filtration method with excellent chemical resistance performance. The filtration method pertaining to the present invention comprises a filtration step in which a liquid to be filtered is filtered by being passed through a porous membrane formed of a resin, and a cleaning step in which the membrane interior of the porous membrane is cleaned after the filtration step, wherein a porous membrane for which the area ratio of a resin part having an area of 1 $\mu m^2$ or less included in a cross section of the membrane interior is at least 70% of the total area of the entire resin part included in the cross section, and said (Continued)

cleaning step includes a step in which an aqueous solution of at least 1% sodium hydroxide is passed through the porous membrane.

3 Claims, 5 Drawing Sheets

(51) Int. Cl.
    *B01D 71/34*     (2006.01)
    *B01D 71/36*     (2006.01)
    *C02F 1/44*     (2006.01)

(52) U.S. Cl.
    CPC .......... *C02F 1/44* (2013.01); *B01D 2321/164* (2013.01); *C02F 2303/16* (2013.01)

(56) References Cited

U.S. PATENT DOCUMENTS

| | | |
|---|---|---|
| 2009/0101600 A1 | 4/2009 | Shiki et al. |
| 2010/0133184 A1 | 6/2010 | Gojo et al. |
| 2011/0239865 A1 | 10/2011 | Haung et al. |
| 2016/0089638 A1 | 3/2016 | Schuster et al. |
| 2019/0022601 A1 | 1/2019 | Okamura |

FOREIGN PATENT DOCUMENTS

| | | |
|---|---|---|
| JP | 2011-168741 A | 9/2011 |
| JP | 2012-40461 A | 3/2012 |
| JP | 2012-511413 A | 5/2012 |
| JP | 2013-75294 A | 4/2013 |
| JP | 2016-523698 A | 8/2016 |
| WO | 2008/120509 A1 | 10/2008 |
| WO | 2017/155004 A1 | 9/2017 |

OTHER PUBLICATIONS

English language translation of Written Opinion issued in International Application No. PCT/JP2018/032737, dated Mar. 10, 2020.
English language translation of International Preliminary Report on patentability issued in International Application No. PCT/JP2018/032737.

* cited by examiner

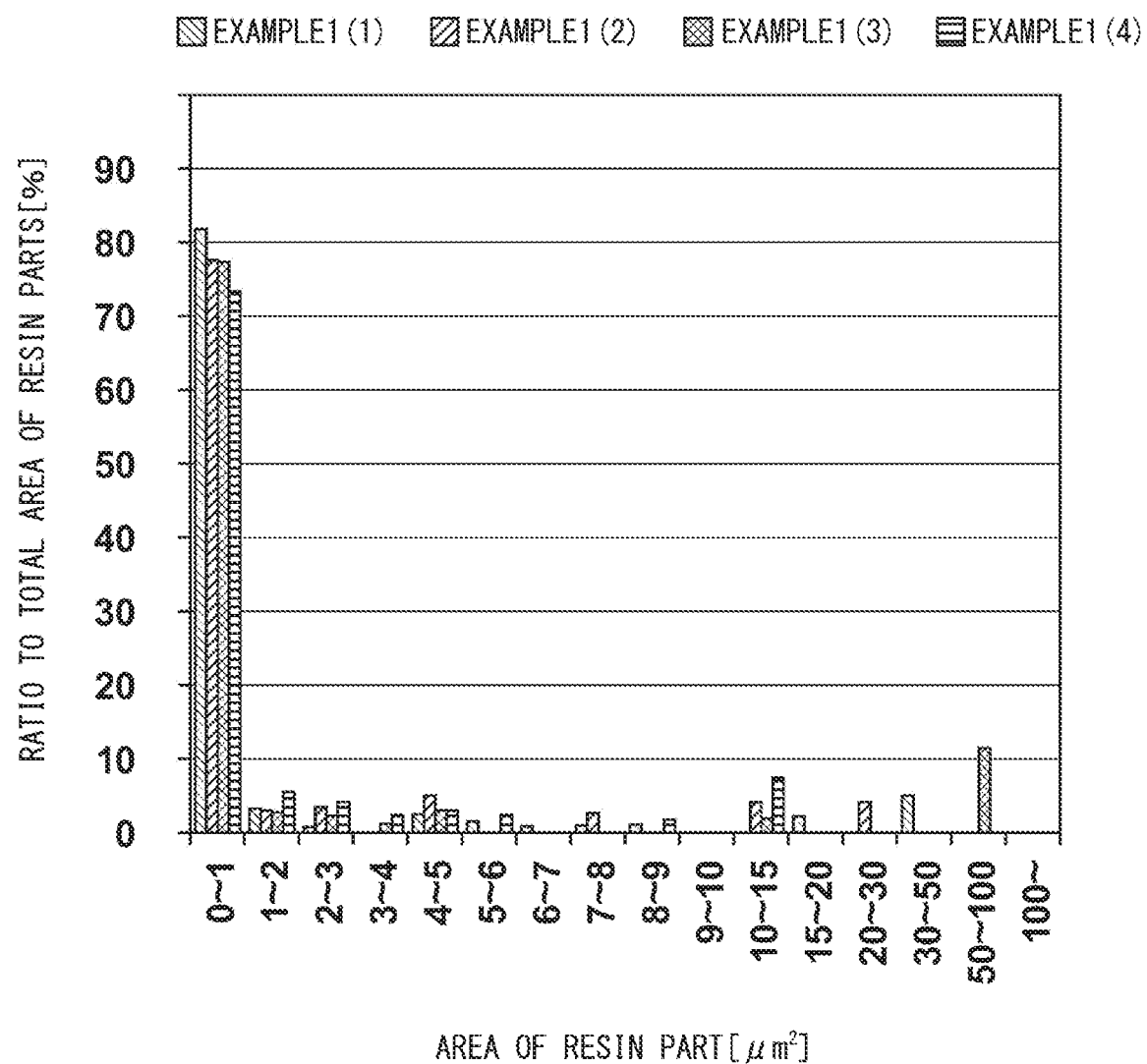

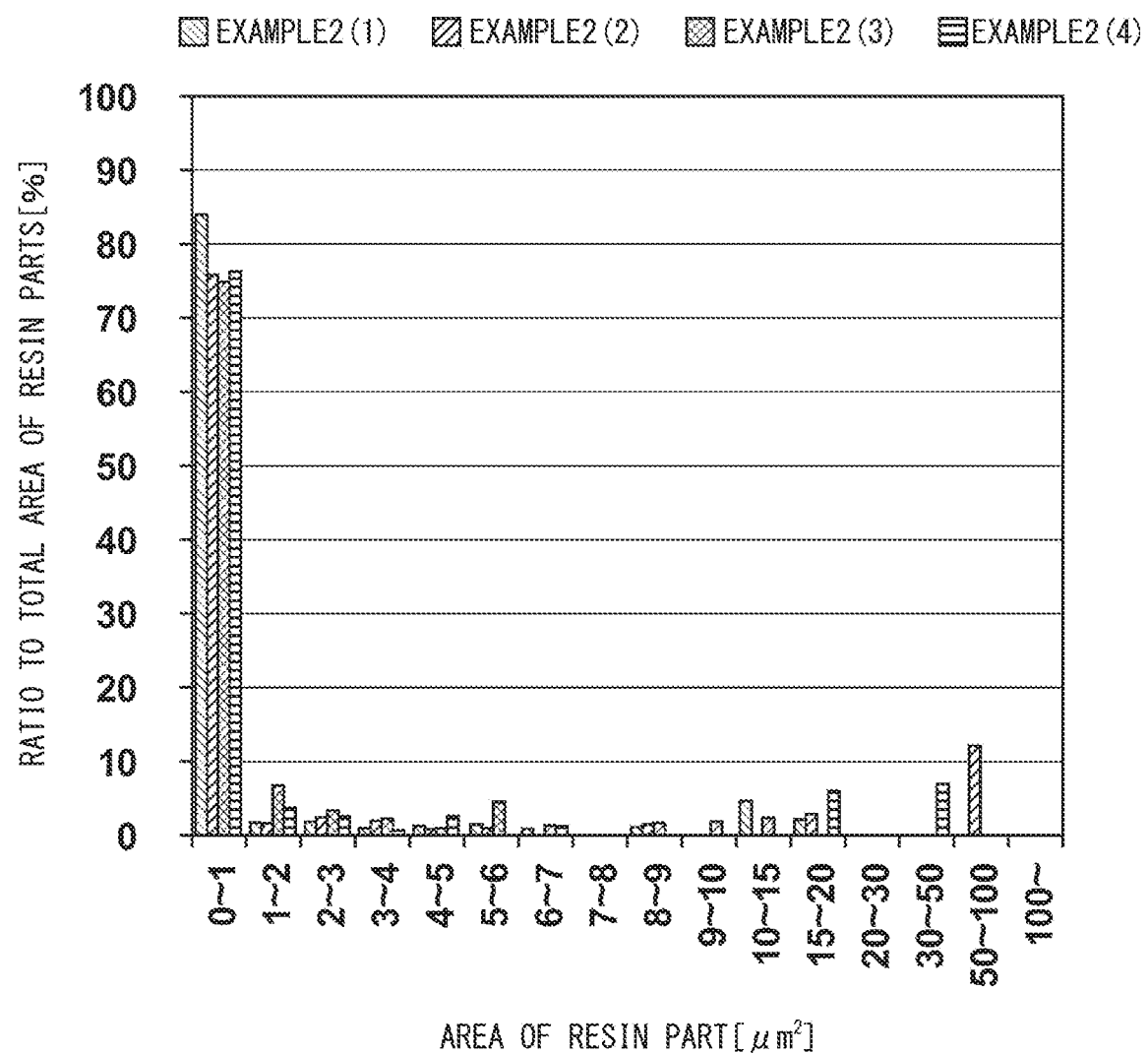

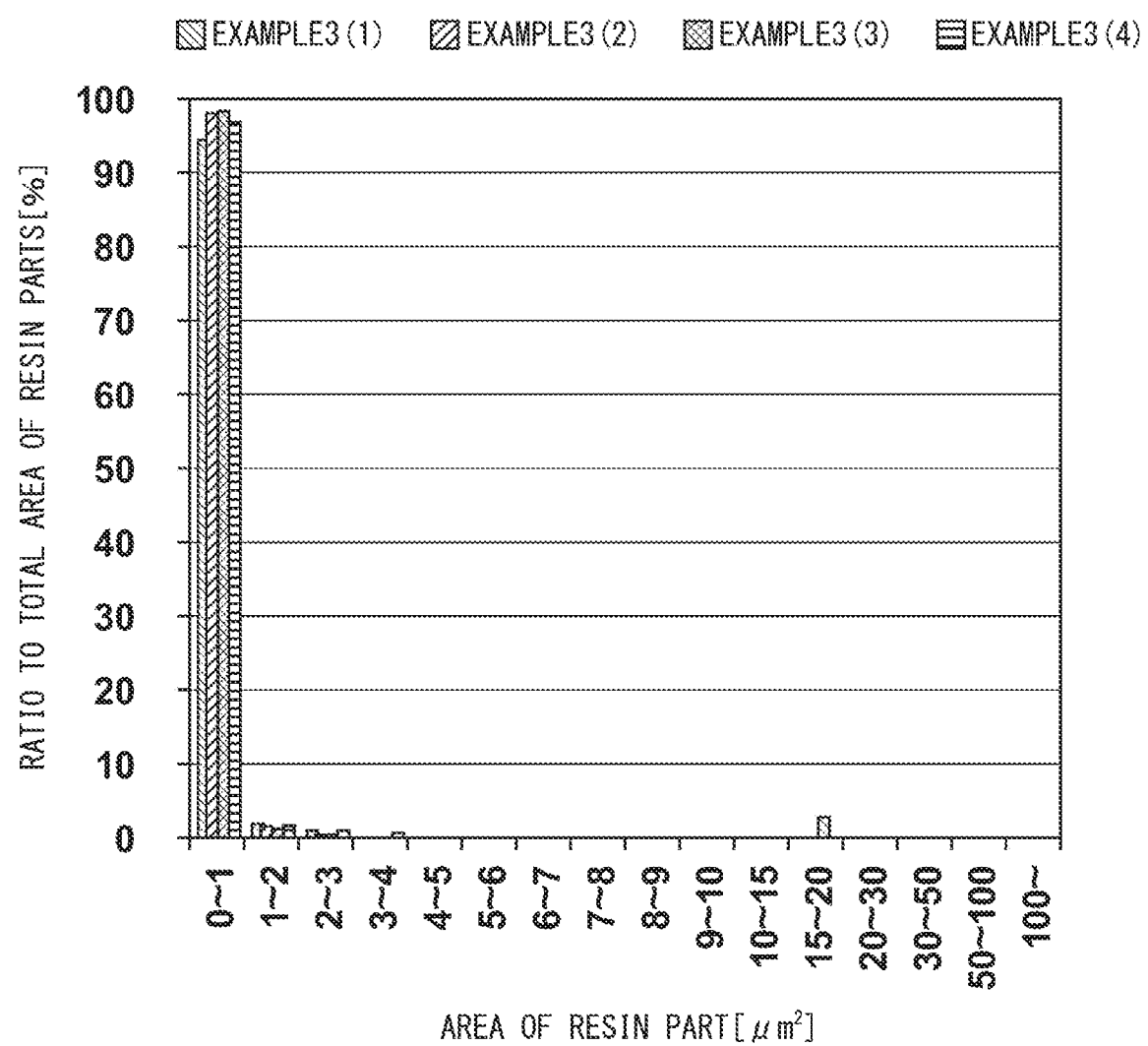

METHOD OF FILTRATION USING POROUS MEMBRANES

FIELD

The present invention relates to a method of filtration using porous membranes.

BACKGROUND

For tap water treatment for obtaining drinking water and industrial water from natural water sources such as river water, lake and marsh water, underground water, etc., which are suspended water, and for sewage treatment for treating domestic wastewater such as sewage, etc., to produce reclaimed water that is dischargeable as clarified water, solid-liquid separation operation (clarification operation) for removing suspended matters is essential. The main clarification operation required is, in regard to the tap water treatment, removal of turbid substances (clay, colloid, bacteria, etc.) derived from natural water source water as suspended water, and regarding the sewage treatment, removal of suspended matters in sewage and suspended matters (sludge, etc.) in treated water that is biologically treated (secondary-treated) with an activated sludge, etc.

Conventionally, these clarification operations have been carried out mainly by a precipitation method, a sand filtration method, and a coagulation sedimentation plus sand filtration method, and recently, a membrane filtration method has been widespread. The advantages of the membrane filtration method are as follows: (1) clarification level of the obtained water quality is high and stable (safety of the obtained water is high), (2) installation space of a filtration apparatus can be small, (3) automatic operation is easy, etc. For example, in tap water treatment, the membrane filtration method is used, as a substitute for the coagulation sedimentation plus sand filtration method, or as a means, etc., for further improving water quality of treated water subjected to the coagulation sedimentation plus sand filtration by installing at a rear stage of the coagulation sedimentation plus sand filtration process. Regarding also the sewage treatment, use of the membrane filtration method is investigated for separation, etc., of a sludge from sewage secondary treated water. In these clarification operations by membrane filtration, a hollow fiber-shaped ultrafiltration membrane or microfiltration membrane (pore diameter in a range of several nm to several hundred nm) is mainly used. As described above, clarification by the membrane filtration method has many advantages that conventional precipitation methods and sand filtration methods do not have, thus, spread to a tap water treatment, and a sewage treatment has been progressing as a substitute technology or complementary technology of conventional methods, and among these membranes, organic membranes using resins are frequently used (for example, refer to PTL 1).

CITATION LIST

Patent Literature

[PTL 1] Japanese Unexamined Patent Publication No. 2011-168741

SUMMARY

Technical Problem

However, although fabricating a filtration membrane using the same resin materials, difference in microstructure of the materials constituting the membrane comes out if a membrane fabrication method is different. Normally, filtration operation is necessarily accompanied by a cleaning step, however, even though the same membrane materials are used for each membrane, there often occurs difference in damage of each membrane by a cleaning chemical agent.

In view of such an issue, a problem to be solved by the present invention is to provide a filtration method comprising a cleaning step using a chemical agent and being excellent in chemical resistance.

Solution to Problem

If a filtration operation is continued, a membrane is always clogged up, and deterioration in strength of the membrane is triggered, accompanied by a cleaning step using a chemical agent. The present inventors have carried out much diligent experimentation with the aim of solving the problems described above. As a result, the present inventors have found that deterioration of the membrane can be minimized by using a membrane having favorable percolativity between fine pores of the membrane, and thus have come to solve the aforementioned problems.

The present inventors have found that by selecting a membrane having favorable percolativity of fine pores from an inner surface to an outer surface, and carrying out a filtration operation, a membrane filtration operation with high efficiency can be accomplished.

The first method of filtration of the present invention comprises a filtration step in which a liquid to be filtered is filtered through a porous membrane formed from a resin, and a cleaning step of cleaning an inside of the porous membrane after the filtration step, wherein the porous membrane has, in all visual fields in a cross section of the inside of the membrane, an area proportion of a resin portion having an area of 1 $\mu m^2$ or less in each of the visual fields, which is 70% or more relative to a total area of all resin portions included in each of the visual fields, and is used in the cleaning step comprising a step of passing a 1% or more sodium hydroxide aqueous solution through the porous membrane.

The second method of filtration of the present invention comprises a filtration step in which a liquid to be filtered is filtered through a porous membrane formed from a resin, and a cleaning step of cleaning an inside of the porous membrane after the filtration step, wherein the porous membrane has, in all visual fields in a cross section of the inside of the membrane, an area proportion of a resin portion having an area of 10 $\mu m^2$ or more in each of the visual fields, which is 15% or less relative to a total area of all resin portions included in each of the visual fields, and is used in the cleaning step comprising a step of passing a 1% or more sodium hydroxide aqueous solution through the porous membrane.

The third method of filtration of the present invention comprises a filtration step in which a liquid to be filtered is filtered through a porous membrane formed from a resin, and a cleaning step of cleaning an inside of the porous membrane after the filtration step, wherein the porous membrane has, in all visual fields in a cross section of the inside of the membrane, an area proportion of a resin portion having an area of 1 $\mu m^2$ or less in each of the visual fields, which is 70% or more relative to a total area of all resin portions included in each of the visual fields, and an area proportion of a resin portion having an area of 10 $\mu m^2$ or more in each of the visual fields, which is 15% or less relative to the total area of all the resin portions included in each of the visual fields, and is used in the cleaning step comprising a step of passing a 1% or more sodium hydroxide aqueous solution through the porous membrane.

Moreover, in the aforementioned method of filtration of the present invention, a concentration of an aqueous solution of sodium hydroxide used in the cleaning step can be 2% or more.

Moreover, in the aforementioned method of filtration of the present invention, a concentration of an aqueous solution of sodium hydroxide used in the cleaning step can be 4% or more.

Moreover, in the aforementioned method of filtration of the present invention, relationship between an elongation E of the porous membrane before the cleaning step and an elongation E1 of the porous membrane after the cleaning step is preferably E1/E0×100≥80%.

Moreover, in the aforementioned method of filtration of the present invention, relationship between a flux L0 of the porous membrane at a start of the cleaning step and a flux L1 of the porous membrane after the cleaning step is preferably 105%≥L1/L0×100≥95%.

Moreover, in the aforementioned method of filtration of the present invention, relationship between an elongation E of the porous membrane before the cleaning step and an elongation EX of the porous membrane when the cleaning step is repeated X (X is a natural number not greater than 100) times is preferably EX/E0×100≥70%.

Moreover, in the aforementioned method of filtration of the present invention, an average pore diameter of an outer surface of the porous membrane is preferably 100 nm or less.

Moreover, in the aforementioned method of filtration of the present invention, the porous membrane is preferably a hollow fiber membrane.

Moreover, in the aforementioned method of filtration of the present invention, the porous membrane is preferably formed from a thermoplastic resin.

Moreover, in the aforementioned method of filtration of the present invention, the thermoplastic resin is preferably a fluorine resin.

Moreover, in the aforementioned method of filtration of the present invention, the fluorine resin is preferably a polymer selected from the group consisting of vinylidene fluoride, chlorotrifluoroethylene, tetrafluoroethylene, ethylene, and hexafluoropropylene, or a mixture of the polymer.

Moreover, in the aforementioned method of filtration of the present invention, relationship between a flux L0 of the porous membrane at a start of the cleaning step and a flux LX of the porous membrane when the cleaning step is repeated X (X is an natural number not greater than 100) times, is preferably 110%≥LX/L0×100≥90%.

Moreover, in the aforementioned method of filtration of the present invention, it is preferred that a rinsing step of discharging a cleaning agent remaining inside the porous membrane after the cleaning step is further comprised, the cleaning step is a step of passing a chemical solution containing a 4% or more aqueous solution of sodium hydroxide through the porous membrane when a flux becomes 50% or less with respect to an initial flux L0 of the porous membrane, the rinsing step is a step of using 10 L or less of rinse water per 1 m² of a membrane area, a pH of filtered water when restarting a filtration step following the rinsing step is 9 or less, and a flux L20 after repeating 20 times the filtration step, the cleaning step, and the rinsing step, has relationship represented by the following equation:

$$105\% \geq L20/L0 \times 100 \geq 80\%$$

with respect to the initial flux L0 of the porous membrane.

Advantageous Effects of Invention

The first, second and third methods of filtration of the present invention enable to use a filtration membrane having a favorable percolativity of fine pores in a cross-sectional microstructure, capable of improving chemical resistance as well as enhancing filtration efficiency.

BRIEF DESCRIPTION OF DRAWINGS

FIG. 2A is an example of a histogram illustrating measurement results on an area distribution of a resin portion in a cross-section of the porous hollow fiber membrane of Example 1.

FIG. 2B is an example of a histogram illustrating measurement results on an area distribution of a resin portion in a cross-section of the porous hollow fiber membrane of Example 2.

FIG. 2C is an example of a histogram illustrating measurement results on an area distribution of a resin portion in a cross-section of the porous hollow fiber membrane of Example 3.

DESCRIPTION OF EMBODIMENTS

Figure 1:
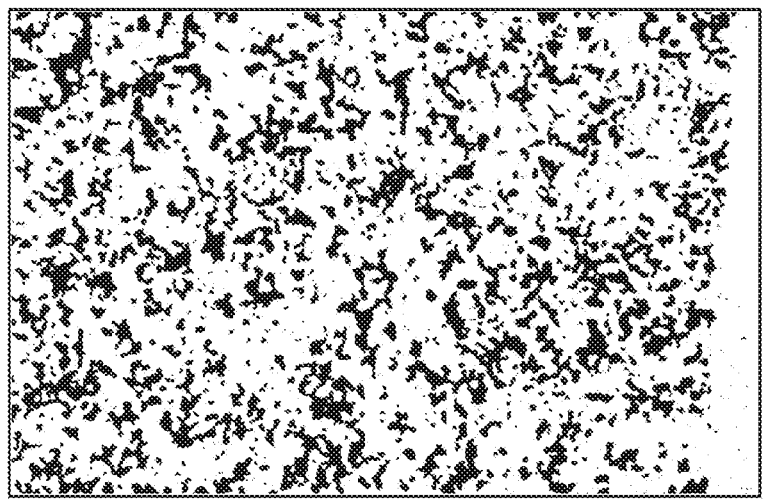
FIG. 1 is an example of a cross-sectional view of the porous hollow fiber membrane used according to one embodiment of the method of filtration of the present invention.

An embodiment for carrying out the invention will now be explained in detail. It is to be understood, however, that the present invention is not limited to the following embodiments.

<Filtration Method>

The method of filtration of the present embodiment comprises a filtration step in which a liquid to be filtered is filtered through a porous hollow fiber membrane (corresponding to the porous membrane of the present invention) formed from a resin, and a cleaning step of cleaning an inside of the porous hollow fiber membrane after the filtration step.

Then, in the method of filtration of the present embodiment, the porous membrane having, in all visual fields in a cross section of an inside of the membrane, an area proportion of a resin portion having an area of 1 μm² or less in each of the visual fields, which is 70% or more relative to a total area of all resin portions included in each of the visual fields, is used. Here, the inside of the porous membrane of the porous hollow fiber membrane means a membrane thickness portion where a number of pores are formed.

In the present embodiment, a hollow fiber-shaped porous hollow fiber membrane is used as the porous membrane, but the present invention is not limited thereto, and a flat membrane or a tubular membrane may be used. However, it is more preferable to use a porous hollow fiber membrane, and by using the porous hollow fiber membrane, the membrane area per module unit volume can be increased.

The materials and production methods of the porous hollow fiber membrane used in the method of filtration of the present embodiment will be described below.

As a filtration step in the method of filtration of the present embodiment, a so-called internal pressure type filtration method in which a liquid to be filtered flows into a hollow portion of the porous hollow fiber membrane, passes through a thickness portion of the porous hollow fiber membrane, and a liquid exuded from an outer surface of the porous hollow fiber membrane is taken out as a filtrate, may be applied, or a so-called external pressure type filtration method in which a liquid to be filtered flows from an outer surface of the porous hollow fiber membrane, and a liquid exuded from an inner surface of the porous hollow fiber membrane is taken out as a filtrate via the hollow portion, may be applied, and the method of filtration of the present embodiment is not limited to a specific method of filtration.

In the present description, the term "inside of the porous membrane" refers to a membrane thickness portion where a large number of fine pores are formed.

Further, the cleaning step in the method of filtration of the present embodiment comprises a step of passing an aqueous solution containing 1% by weight or more of sodium hydroxide through the porous hollow fiber membrane. As the cleaning step, back pressure water washing for removing deposits on the filtration surface of the porous hollow fiber membrane by flowing and ejecting the aforementioned aqueous solution, to an opposite direction of the filtration direction, i.e., from the filtrate side to the side of the filtrate to be filtered or air scrubbing for removing turbid substances adhering to the hollow fiber membrane by oscillating the porous hollow fiber membrane with an aid of air bubbles, etc. In addition, the concentration of the aqueous solution of sodium hydroxide used in the cleaning step is preferably 2% by weight or more and more preferably 4% by weight or more. By using the aqueous solution of sodium hydroxide having such a concentration, a high cleaning effect can be obtained.

The liquid to be filtered in the filtration step of the method of filtration of the present embodiment is not particularly limited, and examples thereof include not only seawater but also suspended water, process liquid, etc. For example, the aforementioned porous hollow fiber membrane is suitably used for the water purification method comprising a step of filtering suspended water.

The term "suspended water" refers to natural water, domestic wastewater, treated water thereof, etc. Examples of natural water include river water, lake and marsh water, underground water, and seawater. Treated water obtained by subjecting these natural waters to sedimentation treatment, sand filtration treatment, coagulation sedimentation plus sand filtration treatment, ozone treatment, activated carbon treatment, etc., is also included in the suspended water concerned. An example of domestic wastewater is sewage. Primary treated water of sewage subjected to screen filtration and sedimentation treatment, secondary treated water of sewage subjected to biological treatment, and further tertiary treated (highly treated) water subjected to the treatments such as coagulation sedimentation plus sand filtration, activated carbon treatment, ozone treatment, etc., are also included in the suspended water concerned. These suspended waters may contain turbid substances (such as humus colloid, organic colloid, clay, bacteria, etc.) constituted of fine organic substances, inorganic substances and organic-inorganic mixtures with a size of not larger than μm order, and polymer substances derived from bacteria and algae.

The quality of the suspended water (aforementioned natural water, domestic wastewater, and treated water thereof) can generally be defined by turbidity and a concentration of organic matters, respectively, which are typical indices of water quality, or combination thereof. When classifying water quality by turbidity (not an instantaneous turbidity, but an average turbidity), it can roughly be classified into low turbid water with a turbidity of less than 1, medium turbid water with a turbidity of 1 or more and less than 10, high turbid water with a turbidity of 10 or more and less than 50, ultrahigh turbid water with a turbidity of 50 or more, etc. Moreover, when classifying water quality by the concentration of organic matters (total organic carbon concentration (TOC): mg/L) (also not an instantaneous value but an average value), it can roughly be classified into low TOC water with a TOC of less than 1, medium TOC water with a TOC of 1 or more and less than 4, high TOC water with a TOC of 4 or more and less than 8, ultrahigh TOC water with a TOC of 8 or more, etc. Basically, water with higher turbidity or TOC is more likely to clog up a filtration membrane and thus the effects of using the porous hollow fiber membrane become greater for water with higher turbidity or TOC.

A process liquid refers to a liquid to be separated when separating valuables from non-valuables in foods, pharmaceuticals, and semiconductor manufacturing. In food production, for example, when liquors such as sake and wine are separated from yeast, the porous hollow fiber membrane of the present embodiment is used. In the manufacture of pharmaceuticals, for example, the porous hollow fiber membrane of the present embodiment is used for sterilization, etc., when purifying proteins. Moreover, in semiconductor manufacturing, for example, the porous hollow fiber membrane of the present embodiment is used to separate abrasives and water from polishing wastewater.

<Porous Hollow Fiber Membrane>

A porous hollow fiber membrane used in the filtration method of the present embodiment has either a total area of resin portions having an area of 1 μm$^2$ or less, which is 70% or more relative to a total area of the resin portions in each region of a total of four visual fields consisting of a visual field including the inner surface of the porous hollow fiber membrane, a visual field including the outer surface thereof, and two fields of vision photographed at equal intervals between the these visual fields, in SEM images of a membrane cross section in a membrane thickness direction orthogonal to the inner surface of the porous hollow fiber membrane; or a total area of resin portions having an area of 10 μm$^2$ or more, which is 15% or less relative to a total area of the resin portions in the same each region; or a total area of resin portions having an area of 1 μm$^2$ or less, which is 70% or more relative to the total area of the resin portions in the same each region as well as a total area of resin portions having an area of 10 μm$^2$ or more, which is 15% or less relative to the total area of the resin portions in the same each region. Preferably, in the same each region, the total area of resin portions having an area of 1 μm$^2$ or less is 70% or more relative to the total area of the resin portions, and the total area of resin portions having an area of more than 1 μm$^2$ and less than 10 μm$^2$ is 15% or less relative to the total area of the resin portions, as well as the total area of resin portions having an area of 10 μm$^2$ or more is 15% or less relative to the total area of the resin portions.

FIG. 1 is an image photograph obtained by binarizing the electron micrograph of one visual field in a cross section of the porous hollow fiber membrane used in the method of filtration of the present embodiment. The cross-sectional view illustrating in FIG. 1 is a cross-sectional view of one visual field in a cross section in the direction orthogonal to the length direction of the porous hollow fiber membrane, and an image photograph by binarizing an SEM image photograph obtained by photographing a visual field of the innermost surface in the aforementioned four visual fields of the porous hollow fiber membrane.

Moreover, in the aforementioned each region, a difference in the existence distribution of the resin portion, i.e., anisotropy of percolativity between the membrane cross section in the membrane thickness direction orthogonal to the inner surface of the porous hollow fiber membrane and the cross section parallel to the inner surface, is virtually negligible.

In the present description, the term "resin portion" is a dendritic skeleton portion of a three-dimensional network structure constituted of a resin that forms a large number of pores in a porous membrane. A black portion in FIG. 1 is a resin portion, and a white portion is a pore.

Inside the porous hollow fiber membrane, a percolated pore that is bent, twisted and percolated from an inside to an outside of the membrane, is formed, and if a total area of resin portions having an area of 1 µm$^2$ or less is 70% or more relative to a total area of the resin portions in each region of a total of four visual fields consisting of a visual field including the inner surface of the porous hollow fiber membrane, a visual field including the outer surface thereof, and two fields of vision photographed at equal intervals between the these visual fields, in SEM images of a membrane cross section in a membrane thickness direction orthogonal to the inner surface of the porous hollow fiber membrane, percolativity of pores is high (i.e., high existence proportion of percolated pores inside the membrane), the flux (amount of permeated water, water permeability) of a liquid to be treated is high, and retention ratio of an amount of permeated water after cleaning is high, therefore reducing damage to the membrane after cleaning by a chemical solution as well, which is indexed by a tensile elongation at break. However, if a proportion of a total area of resin portions having an area of 1 µm$^2$ or less with respect to a total area of the resin portions, is too high, a dendritic skeleton portion of a three-dimensional network structure constituted of a resin that forms a large number of pores in a porous membrane, becomes too thin, and therefore, a total area of resin portions having an area of greater than 1 µm$^2$ is preferably 2% or more and 30% or less relative to the total area of the resin portions while maintaining the total area of resin portions having an area of 1 µm$^2$ or less, which is 70% or more relative to the total area of the resin portions, more preferably a total area of resin portions having an area of 10 µm$^2$ or more is 15% or less relative to the total area of the resin portions, and still more preferably a total area of resin portions having an area of greater than 1 µm$^2$ and less than 10 µm$^2$ is 15% or less relative to the total area of the resin portions as well as the total area of resin portions having an area of 10 µm$^2$ or more is 2% or more and 15% or less relative to the total area of the resin portions. If the total area of resin portions having an area of greater than 1 µm$^2$ is 2% or more and 30% or less with respect to the total area of the resin portions, the dendritic skeleton portion of the three-dimensional network structure constituted of the resin does not become too thin, therefore capable of appropriately maintaining the strength of the porous membrane and the tensile elongation at break thereof.

Figure 2D:
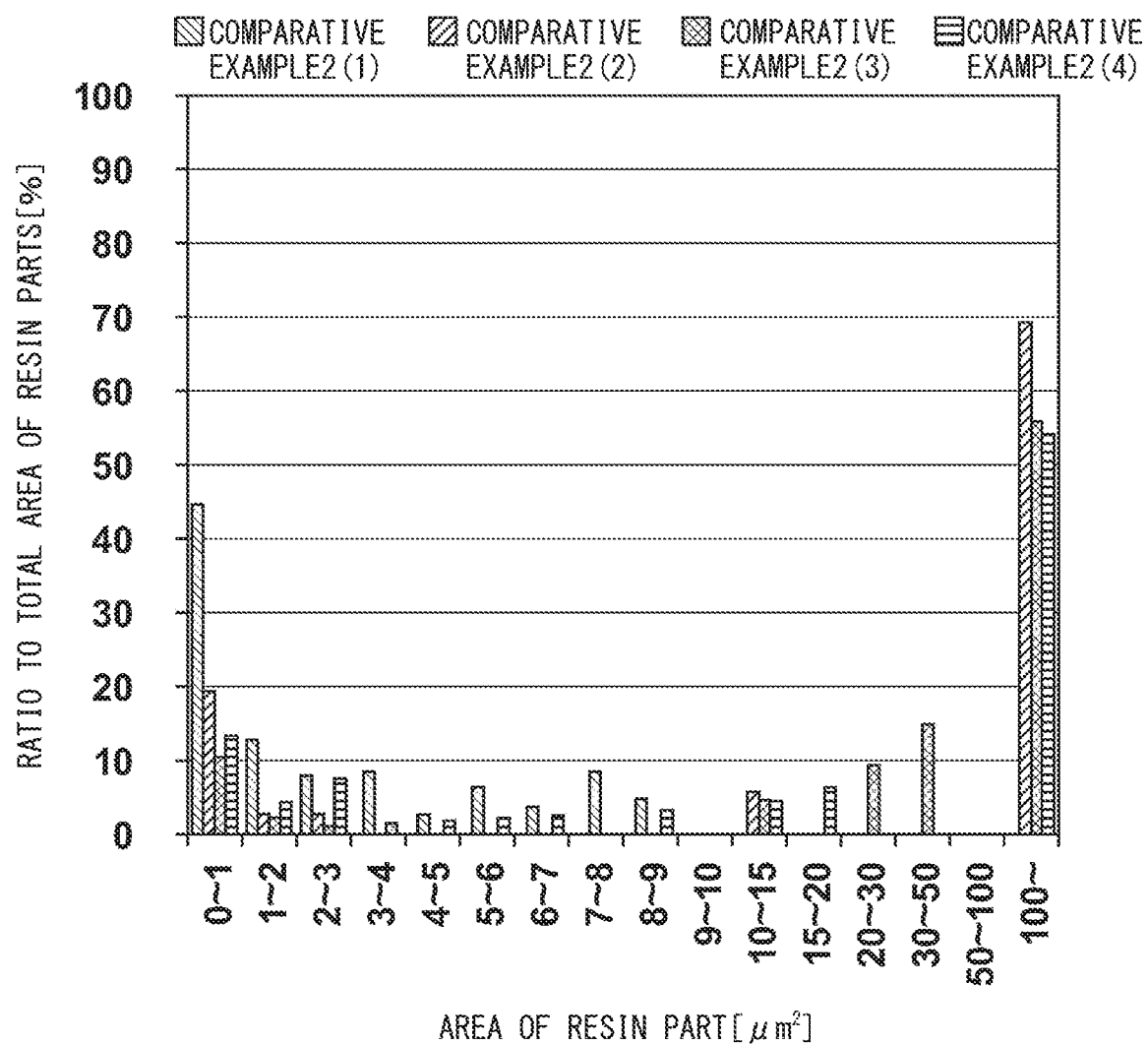
FIG. 2D is an example of a histogram illustrating measurement results on an area distribution of a resin portion in a cross-section of the porous hollow fiber membrane of Comparative Example 2.

FIGS. 2A to 2D are each a histogram illustrating the measurement results on an area distribution of a resin portion by analyzing a cross section of each visual field of the porous hollow fiber membrane shown in FIG. 1. FIG. 2A illustrates the measurement results of Example 1 to be described below, FIG. 2B illustrates the measurement results of Example 2, FIG. 2C illustrates the measurement results of Example 3, and FIG. 2D illustrated the measurement results of Comparative Example 2.

In FIG. 1, the resin portion appears in a granular form. In FIGS. 2A to 2D, the areas of the granular resin portions are each measured, and for each area of the granular resin portion, the area proportion with respect to the total area of the entire resin portion in the cross-sectional view is illustrated as a histogram. It is noted that 1 in circle (parentheses) to 4 in circle (parentheses) in FIGS. 2A to 2D are numbers of the aforementioned visual fields that are sequentially photographed at equal intervals from the inner surface to the outer surface of the porous hollow fiber membrane. For example, 1 in circle (parentheses) of Example 1 means a number in the histogram of the cross-sectional view of the visual field photographed in the innermost surface side of the porous hollow fiber membrane of Example 1, and 4 in circle (parentheses) of Example 1 means a number in the histogram of the cross-sectional view of the visual field photographed in the outermost surface side of the porous hollow fiber membrane of Example 1.

In addition, the measurement method of an area distribution of a resin portion in a cross-sectional view of each visual field of the porous hollow fiber membrane will be described below.

The opening ratio (surface opening ratio) of the surface of the porous hollow fiber membrane is 25 to 60%, preferably 25 to 50%, and more preferably 25 to 45%. By using for filtration, a membrane having the surface opening ratio on the side in contact with a liquid for treatment of 25% or more, deterioration of the water permeability due to clogging as well as membrane surface abrasion is reduced, capable of enhancing filtration stability. However, if the surface opening ratio is high and the pore diameter is too large, the required separation performance may not be exhibited. Therefore, the average pore diameter of fine pores in the outer surface is preferably 10 nm to 700 nm and more preferably 20 nm to 600 nm. When the average fine pore diameter is 30 to 400 nm, the separation performance is sufficient, and the pore percolativity can be ensured. The measurement methods of the surface opening ratio and the average pore diameter will be described later.

The membrane thickness of the porous membrane is preferably 80 to 1,000 µm and more preferably 100 to 300 µm. If the membrane thickness is 80 µm or more, the strength is increased. On the other hand, if it is 1000 µm or less, the pressure loss due to the membrane resistance becomes small.

The porosity of the porous hollow fiber membrane 10 is preferably 50 to 80% and more preferably 55 to 65%. When the porosity is 50% or more, the water permeability is high, and on the other hand, when it is 80% or less, the mechanical strength can be increased.

An example of a shape of the porous hollow fiber membrane includes an annular single-layer membrane, but it may be a multilayer membrane having different pore sizes in a separation layer and a support layer supporting the separation layer. Further, the cross-sectional structure may be irregular, such as having protrusions, etc., on an inner surface and an outer surface of the membrane.

Further, the porous hollow fiber membrane used in the method of filtration of the present embodiment preferably has a three-dimensional network structure instead of a spherulite structure. With the three-dimensional network structure of the membrane, the percolativity of pores formed from the inner surface to the outer surface of the porous hollow fiber membrane can be improved.

<Material (Material Quality) of Porous Hollow Fiber Membrane>

The resin constituting the porous hollow fiber membrane is preferably a thermoplastic resin and more preferably a fluororesin. The fluororesin includes one selected from the group consisting of a vinylidene fluoride resin (PVDF), chlorotrifluoroethylene resin, tetrafluoroethylene resin, ethylene-tetrafluoroethylene copolymer (ETFE), ethylene-monochlorotrifluoroethylene copolymer (ECTFE), hexafluoropropylene resin and mixtures of these resins.

Examples of the thermoplastic resin include polyolefin, or copolymer of olefin and halogenated olefin, or halogenated polyolefin, or mixtures thereof. Examples of the thermoplastic resin include polyethylene, polypropylene, polyvinyl alcohol, ethylene-vinyl alcohol copolymer, ethylene-tetrafluoroethylene copolymer, polyvinylidene difluoride (may include a hexafluoropropylene domain), or mixtures thereof. Since these materials are thermoplastic and excellent in handleability and toughness, these are excellent as membrane materials. Among these, the vinylidene difluoride resin, tetrafluoroethylene resin, hexafluoropropylene resin or a mixture thereof, homopolymers or copolymers of ethylene, tetrafluoroethylene, and chlorotrifluoroethylene, or a mixture of the aforementioned homopolymer or the copolymer, are preferable because these are excellent in mechanical strength, chemical strength (chemical resistance) and also favorable in moldability. More specifically, fluororesins such as polyvinylidene difluoride, vinylidene fluoride-hexafluoropropylene copolymer, ethylene-tetrafluoroethylene copolymer, ethylene-chlorotrifluoroethylene copolymer, etc., are included.

Moreover, the porous hollow fiber membrane can contain up to about 5% by weight of components (impurities, etc.) other than the thermoplastic resin. For example, the solvent used when producing the porous hollow fiber membrane, can be contained. As will be described later, in the porous hollow fiber membrane, a first solvent (hereinafter also referred to as a non-solvent) used as a solvent upon a production of the porous hollow fiber membrane, a second solvent (hereinafter also referred to as a good solvent or a poor solvent), or both thereof are included.

These solvents can be detected by pyrolysis GC-MS (gas chromatography mass spectrometry).

The first solvent can be at least one type selected from the group consisting of sebacic acid ester, citric acid ester, acetyl citric acid ester, adipic acid ester, trimellitic acid ester, oleic acid ester, palmitic acid ester, stearic acid ester, phosphoric acid ester, fatty acid having 6 or more and 30 or less carbon atoms, and epoxidized vegetable oil.

Other than the first solvent, the second solvent can also be at least one type selected from the group consisting of sebacic acid ester, citric acid ester, acetyl citric acid ester, adipic acid ester, trimellitic acid ester, oleic acid ester, palmitic acid ester, stearic acid ester, phosphorus acid ester, fatty acid having 6 or more and 30 or less carbon atoms, and epoxidized vegetable oil. Examples of the fatty acid having 6 or more and 30 or less carbon atoms include capric acid, lauric acid, oleic acid, etc. Moreover, as an epoxidized vegetable oil, epoxidized soybean oil, epoxidized linseed oil, etc., are included.

Moreover, the first solvent is preferably the non-solvent such that a thermoplastic resin does not uniformly dissolve in the first solvent even if in a first mixed solution having a ratio of the thermoplastic resin to the first solvent of 20:80, a temperature of the first mixed solution is increased to the boiling point of the first solvent.

Moreover, the second solvent is preferably a solvent such that the thermoplastic resin uniformly dissolves in the second solvent, in a second mixed solution having a ratio of the thermoplastic resin to the second solvent of 20:80, at any temperature of the second mixed solution that is higher than 25° C. and not higher than the boiling point of the second solvent.

Moreover, it is more preferred that in the second mixed solution having a ratio of the thermoplastic resin to the second solvent of 20:80, the second solvent is a poor solvent such that the thermoplastic resin does not uniformly dissolve in the second solvent at a second mixed solution temperature of 25° C., and uniformly dissolves in the second solvent at any temperature of the second mixed solution that is higher than 100° C. and not higher than the boiling point of the second solvent.

Further, in the method of filtration of the present embodiment, a porous hollow fiber membrane using polyvinylidene difluoride as the thermoplastic resin and containing at least the first solvent (non-solvent) can be used.

The first solvent is at least one type selected from the group consisting of sebacic acid ester, citric acid ester, acetyl citric acid ester, adipic acid ester, trimellitic acid ester, oleic acid ester, palmitic acid ester, stearic acid ester, phosphoric acid ester, fatty acid having 6 or more and 30 or less carbon atoms and epoxidized vegetable oil, and in the first mixed solution having a ratio of polyvinylidene difluoride to the first solvent of 20:80, it can be the non-solvent such that polyvinylidene difluoride does not uniformly dissolve in the first solvent even if a temperature of the first mixed solution is raised to the boiling point of the first solvent.

Moreover, the aforementioned porous hollow fiber membrane may contain a second solvent other than the first solvent.

The second solvent is at least one type selected from the group consisting of sebacic acid ester, citric acid ester, acetyl citric acid ester, adipic acid ester, trimellitic acid ester, oleic acid ester, palmitic acid ester, stearic acid ester, phosphoric acid ester, fatty acid having 6 or more and 30 or less carbon atoms, and epoxidized vegetable oil, and in a second mixed solution having a ratio of polyvinylidene difluoride to the second solvent of 20:80, it is preferably a solvent such that polyvinylidene difluoride uniformly dissolves in the second solvent at any temperature of a second mixed solution that is higher than 25° C. and not higher than the boiling point of the second solvent.

The second solvent is more preferably a poor solvent such that polyvinylidene difluoride does not uniformly dissolve in the second solvent at a second mixed solution temperature of 25° C., and uniformly dissolves in the second solvent at any temperature of the second mixed solution that is higher than 100° C. and not higher than the boiling point of the second solvent. As the poor solvent, tributyl acetyl citrate (ATBC) is preferable.

<Physical Properties of Porous Hollow Fiber Membrane>

An initial value of a tensile elongation at break is preferably 60% or more, more preferably 80% or more, still more preferably 100% or more, and particularly preferably 120% or more. The tensile elongation at break can be measured by the measurement method in Examples to be described below.

Alkali resistance can be measured by a retention ratio (elongation retention ratio after NaOH immersion) of the tensile elongation at break before and after alkali immersion, and the tensile elongation at break (corresponding to the tensile elongation at break $E1$ of the porous hollow fiber membrane after the cleaning step) retained after having been immersed in a 4% by weight NaOH aqueous solution for 10 days, is preferably 80% or more, more preferably 85% or more, and still more preferably 90% or more, relative to the initial value (corresponding to the tensile elongation at break $E0$ of the porous hollow fiber membrane before the cleaning step).

The relationship between the aforementioned initial value $E0$ and the tensile elongation at break $EX$ of the porous hollow fiber membrane after repeating the cleaning step such as back pressure water washing, etc., X (X is a natural number not greater than 100) times, is preferably $EX/E0 \times 100 \geq 70\%$, more preferably $EX/E0 \times 100 \geq 75\%$, and still more preferably $EX/E0 \times 100 \geq 80\%$.

From a viewpoint of practical use, the compressive strength of the porous hollow fiber membrane is preferably 0.2 MPa or more, more preferably 0.3 to 1.0 MPa. and still more preferably 0.4 to 1.0 MPa.

<Water Permeability of Porous Hollow Fiber Membrane>

As a porous hollow fiber membrane, the relationship between a flux L0 of the porous hollow fiber membrane at a start of the filtration step and a flux L1 of the porous hollow fiber membrane after the cleaning step is preferably $105\% \geq L1/L0 \times 100 \geq 95\%$.

Moreover, the relationship between a flux L of the porous hollow fiber membrane at a start of the filtration step and a flux LX of the porous hollow fiber membrane after repeating the cleaning step X (X is a natural number not greater than 100) times is preferably $110\% \geq LX/L0 \times 100 \geq 90\%$.

Furthermore, the method of filtration of the embodiment further comprises a rinsing step of discharging a cleaning agent remaining inside the porous membrane after the cleaning step, and it is preferred that the cleaning step is a step of passing a chemical solution containing 4% or more aqueous solution of sodium hydroxide through the porous membrane when a flux becomes 50% or less with respect to the initial flux L0 of the porous membrane, the rinsing step is a step of using 10 L of rinse water per 1 m² of membrane area, the pH of the filtered water when restarting the filtration step after the rinsing step, is 9 or less and the flux L20 after repeating 20 times the filtration step, the cleaning step, and the rinsing step, has the following relation:

$$105\% \geq L20/L0 \times 100 \geq 80\%$$

with respect to the initial flux L0 of the porous membrane:

<Production Method of Porous Hollow Fiber Membrane>

Next, a method for producing a porous hollow fiber membrane will be described below provided that the method of producing the porous hollow fiber membrane used for the method of filtration of the present embodiment is not limited to the following production methods.

The method for producing the porous hollow fiber membrane used in the method of filtration of the present embodiment comprises (a) a step of preparing a melt-kneaded product, (b) a step of supplying the melt-kneaded product to a multi-structure spinning nozzle and extruding the melt-kneaded product from the spinning nozzle to obtain a hollow fiber membrane, and step (c) of extracting a plasticizer from the hollow fiber membrane. When the melt-kneaded product contains an additive, a method for producing the porous hollow fiber membrane 10 comprises a step (d) of extracting the additive from the hollow fiber membrane after step (c).

The concentration of the thermoplastic resin of the melt-kneaded product is preferably 20 to 60% by weight, more preferably 25 to 45% by weight, and still more preferably 30 to 45% by weight. If this value is 20% by weight or more, the mechanical strength can be increased, and if it is 60% by weight or less, the water permeability can be increased. The melt-kneaded product may contain an additive.

The melt-kneaded product may be constituted of two components of a thermoplastic resin and a solvent or may be constituted of three components of the thermoplastic resin, an additive, and the solvent. As will be described below, the solvent contains at least the non-solvent.

As the extractant used in step (c), it is preferable to use a liquid that does not dissolve the thermoplastic resin but has high affinity with solvents such as methylene chloride and various alcohols.

Moreover, when using a melt-kneaded product containing no additive, a hollow fiber membrane obtained through step (c) may be used as a porous hollow fiber membrane. In the case of producing a porous hollow fiber membrane using a melt-kneaded product containing the additive, the method of production according to the present embodiment preferably further comprises step (d) of extracting and removing the additive from a hollow fiber membrane to obtain a porous hollow fiber membrane after step (c). As for the extractant in step (d), it is preferred to use a liquid using hot water, acid or alkali that can dissolve the additive but does not dissolve a thermoplastic resin.

An inorganic material may be used as an additive. The inorganic material is preferably inorganic fine powder. The primary particle diameter of the inorganic fine powder contained in the melt-kneaded product is preferably 50 nm or less, more preferably 5 nm or more and less than 30 nm. Specific examples of the inorganic fine powder include silica (including fine powder silica), titanium oxide, lithium chloride, calcium chloride, organic clay, etc. Among these, fine silica powder is preferable from the viewpoint of cost. The aforementioned "primary particle diameter of inorganic fine powder" means a value obtained from analysis of an electron micrograph photograph. Accordingly, first, a group of inorganic fine powder is pretreated by the method of ASTM D3849. Thereafter, the particle diameters of 3000 to 5000 particles photographed in transmission electron micrograph are measured, and the primary particle diameter of the inorganic fine powder is calculated by arithmetically averaging these obtained values.

As for the inorganic fine powder inside the porous hollow fiber membrane, the existing material can be identified by identifying the element which exists in fluorescent X-rays measurement, etc.

When an organic substance is used as an additive, hydrophilicity can be imparted to the hollow fiber membrane by using hydrophilic polymers such as polyvinyl pyrrolidone, polyethylene glycol, etc. Moreover, the viscosity of the melt-kneaded product can be controlled by using additives having a high viscosity such as glycerin, ethylene glycol, etc.

Next, step (a) of preparing a melt-kneaded product in the method for producing the porous hollow fiber membrane of the present embodiment will be described in detail.

In the method for producing the porous hollow fiber membrane of the present embodiment, the non-solvent for a thermoplastic resin is mixed with a good solvent or a poor solvent. The mixed solvents after mixing become the non-solvent for the thermoplastic resin used. Thus, when the non-solvent is used as a raw material for the membrane, a porous hollow fiber membrane having a three-dimensional network structure is obtained. The mechanism of action thereof is not necessarily clear, but it is conjectured that the use of a solvent with a lower solubility by mixing the non-solvent moderately inhibits the crystallization of the polymer and is likely to induce formation of the three-dimensional network structure. For example, the non-solvent and poor solvent or good solvent are selected from the group consisting of phthalic acid ester, sebacic acid ester, citric acid ester, acetyl citric acid ester, adipic acid ester, trimellitic acid ester, oleic acid ester, palmitic acid ester, stearic acid ester, phosphate ester, fatty acid having 6 or more and 30 or less carbon atoms, various esters such as an epoxidized vegetable oil, etc.

A solvent that can dissolve the thermoplastic resin at room temperature is a good solvent, a solvent that cannot dissolve it at room temperature but can dissolve it at an elevated temperature is a poor solvent for the thermoplastic resin, and a solvent that cannot dissolve it even at an elevated temperature is referred to as the non-solvent, and the good solvent, poor solvent, and non-solvent can be judged as follows.

Accordingly, about 2 g of a thermoplastic resin and about 8 g of a solvent are put into a test tube, heated to the boiling point of the solvent in about steps of 10° C. with a block heater for the test tube, stirred inside of the test tube with a spatula, etc., and a solvent that dissolves the thermoplastic resin can be judged as a good or poor solvent, and a solvent that does not dissolve it is the non-solvent. A solvent that dissolves it at a relatively low temperature of 100° C. or lower is defined as a good solvent, and a solvent that does not dissolve it unless heated to 100° C. or higher and an elevated temperature of the boiling point or lower is defined as a poor solvent.

For example, when polyvinylidene difluoride (PVDF) is used as the thermoplastic resin and acetyl tributyl citrate, dibutyl sebacate and dibutyl adipate are used as solvents, PVDF is uniformly mixed with these solvents and dissolved at about 200° C. On the other hand, when bis-2-ethylhexyl adipate, diisononyl adipate, and bis-2-ethylhexyl sebacate are used as solvents, PVDF does not dissolve in these solvents even if the temperature is raised to 250° C. Further, when ethylene-tetrafluoroethylene copolymer (ETFE) is used as the thermoplastic resin and diethyl adipate is used as solvent. ETFE is uniformly mixed and dissolves at about 200° C. On the other hand, when bis-2-ethylhexyl adipate is used as solvent, ETFE does not dissolve. Moreover, when ethylene-monochlorotrifluoroethylene copolymer (ECTFE) is used as the thermoplastic resin and triethyl citrate is used as solvent, ECTFE uniformly dissolves at about 200° C., and when triphenyl phosphite is used, ECTFE does not dissolve.

EXAMPLES

The present invention will be specifically described below by way of the examples. Naturally, the present invention is not limited thereto. Each physical property in Examples and Comparative Examples is determined according to the methods as described below.

(1) Outer Diameter and Inner Diameter of Membrane

A porous hollow fiber membrane was sliced thinly with a razor blade, and the outer diameter and inner diameter were measured with a 100 Times magnifier. For each sample, a total of 60 cut surfaces at intervals of 30 mm were measured, and the averaged value of the outer diameters and that of the inner diameters were regarded as an outer diameter and inner diameter, respectively.

(2) Electron Microscope Photography

A porous hollow fiber membrane was cut into an annular form in a direction perpendicular to the length direction, stained with 10% phosphotungstic acid plus osmium tetroxide, and embedded in an epoxy resin. Next, after trimming, the cross section of the sample was subjected to BIB processing to prepare a smooth cross section, and a conductive treatment was carried out to prepare a microsection. Using the microsection and an electron microscope SU8000 series manufactured by Hitachi, Ltd., electron microscope (SEM) images in the cross section of the membrane (thickness portion) were photographed at four sections thereof with equal intervals from the inner surface toward the outer surface by magnification of 5,000 to 10,000× at an accelerating voltage of 1 kV. Specifically, the images were photographed in the predetermined visual fields in each region (1 in circle to 4 in circle in FIGS. 2A to 2D) of the total of four visual fields of the visual field including the inner surface of the cross section of membrane (thickness portion), the visual field including the outer surface of the membrane, and two fields of vision photographed at equal intervals between these visual fields. These images can be measured by changing the magnification according to the average pore diameter. Specifically, when the average pore diameter was 0.1 m or more, the magnification was 5000 times, and when the average pore diameter was 0.05 μm or more and less than 0.1 μm, it was 10,000 times. In the case of the average pore diameter of less than 0.05 μm, it was set to 30,000 times. In addition, the field size was 2560×1920 pixels.

For image processing, an Image J was used and the photographed SEM image was binarized into a pore portion and a resin portion by applying a Threshold processing (Image-Adjust-Treshold: Otsu method (Otsu was selected)) to the SEM image.

Surface opening ratio: It was measured by calculating the ratio between the resin portion and the pore portion of the binarized image.

Area distribution of resin portion: Using Image J's "Analyze Particle" command (Analyze Particle: Size 0.10-Infinity), the size of the binarized granular resin portion included in the SEM image of the cross section was measured. When the total area of the entire resin portion included in the SEM image was $\Sigma S$ and the area of the resin portion of 1 $\mu m^2$ or less was $\Sigma S$ (<1 $\mu m^2$) an area ratio of the area of the resin portion of 1 $\mu m^2$ or less was calculated by calculating $\Sigma S$ (<1 $\mu m^2$)$\Sigma S$.

It is noted that, regarding noise removal upon carrying out the binarization processing, the resin portion having the area less than 1 $\mu m^2$ was removed as noise, and the resin portion with the area of 1 $\mu m^2$ or more was applied for the analysis. The noise removal was carried out using a median filter processing (Process-Filters-Median: Radius: 3.0 pixels).

The granular resin portion cut at the edge of the SEM image was also applied for measurement. The processing of "include Holes" (fill in hole) was not carried out. The processing of correcting the shape from a "snowman" type to a "flat" type, etc., was not carried out.

Average pore diameter (fine pore diameter): It was measured using Image J's "Plugins-Bone J-Thickness" command. The space size was defined as the maximum size of circle that can enter the void.

(3) Water Permeability

After immersing the porous hollow fiber membrane in ethanol and then immersing in pure water several times, one end of the wet hollow fiber membrane having a length of about 10 cm was sealed, and an injection needle was inserted into the hollow portion at the other end. Pure water at 25° C. was injected from the injection needle at a pressure of 0.1 MPa under an environment of 25° C., and the amount of pure water permeating from the outer surface of the membrane was measured. The pure water flux was determined using the equation below:

Pure water flux $[L/m^2/h]$=60×(Amount of permeated water $[L]$)/{π×(Membrane outer diameter $[m]$)× (Membrane effective length $[m]$)×(Measurement time $[min]$)} and the water permeability was evaluated.

In is noted that the membrane effective length refers to the net membrane length excluding the portion where the injection needle is inserted.

(4) Retention Ratio of Water Permeability Upon Filtration of Suspended Water

The retention ratio of water permeability when filtrating suspended water, is an index for judging the degree of deterioration of water permeability due to clogging (fouling). Using a wet hollow fiber membrane that was immersed in ethanol and subsequently in pure water several times, the filtration thereof was carried out by an external pressure method with an effective membrane length of 11 cm. First, pure water was filtered at a filtration pressure capable of permeating 10 m$^3$ of pure water per day per 1 m$^2$ of the outer membrane surface area, and the permeated water was collected for 2 minutes, which was regarded as an initial amount of permeated pure water. Next, the suspended water (natural seawater collected from Tokyo Bay, Kawasaki Port: turbidity of 2.2, TOC concentration of 2.4 ppm) was filtered for 10 minutes at the same filtration pressure as when the initial amount of permeated pure water was measured. The permeated water was collected for 2 minutes from the 8th minute to the 10th minute during filtration, which was regarded as an amount of permeated water upon filtration of the suspended water. The retention ratio of water permeability upon filtration of suspended water was defined by the equation below:

Retention ratio of water permeability upon filtration of suspended water [%]=100×(Amount of permeated water upon filtration of suspended water [g])/(Initial amount of permeated pure water [g])

In addition, the entire operation was carried out at 25° C. and membrane surface linear velocity of 0.5 m/second, and each parameter in the equation was calculated by the following equations:

Filtration pressure={(Input pressure)+(Output pressure)}/2

Outer membrane surface area [m$^2$]=π×(Fiber outer diameter [m])×(Membrane effective length [m])

Membrane surface linear velocity [m/s]=4×(Amount of circulated water [m$^3$/s]/{π×(Tube diameter [m])$^2$−π×(Outer membrane diameter [m])$^2$}

In this measurement, the filtration pressure of the suspended water was not the same for each membrane, and the initial permeability of permeated pure water (also the permeability at the start of filtration of suspended water) was set to a permeability at a filtration pressure that allows 10 m$^3$ to be permeated per day per 1 m$^2$ of the membrane surface area. Accordingly, for example, when a Flux was set to 1 m/d=417 LMH, the pressure of the membrane of Example 1 became about 10 kPa, and after the initial pressure was unified thereto, the suspended water was filtered, and a state where the Flux was chronologically reduced, was observed. Therefore, the initial pressures when the membranes of Examples 2 and 3 were used were slightly different from the initial pressure when the membrane of Example 1 was used. This is because in actual tap water treatment and sewage treatment, the membrane is usually used in quantitative filtration operation (a method of filtration operation in which the filtration pressure is adjusted so that a constant amount of filtered water is obtained within a certain period of time), and therefore, this measurement was also carried out so that the deterioration of water permeability under conditions as close as to those of the quantitative filtration operation, could be compared for each membrane within the scope of measurement using one hollow fiber membrane.

(5) Tensile Elongation at Break (%)

The load and displacement upon tensile breakage were measured under the following conditions.

The porous hollow fiber membrane was used as it was as a sample according to JIS K7161.

Measurement instrument: An Instron type tensile tester (AGS-5D manufactured by Shimadzu Corporation)

Distance between chucks: 5 cm

Tensile speed: 20 cm/minute

From the results obtained, the tensile elongation at break was calculated according to JIS K7161.

(6) Alkali Resistance Test

After the filtration step of suspended water carried out in (4) above, the porous hollow fiber membrane was cut into 10 cm, and 20 fibers were immersed in 500 m$^1$ of a 4% sodium hydroxide aqueous solution and maintained at 40° C. for 10 days. The tensile elongation at break of the membrane before and after immersion in sodium hydroxide was measured 20 times (n20), and the average value thereof was calculated. The elongation retention ratio after NaOH immersion was defined by the following formula:

Elongation retention ratio after NaOH immersion= (Tensile elongation at break after immersion)/ (Tensile elongation at break before immersion)× 100 and then the alkali resistance was evaluated. In addition, the tensile elongation at break before immersion corresponds to the tensile elongation at break before the cleaning step, and the tensile elongation at break after immersion corresponds to the tensile elongation at break after the cleaning step.

Further, after the aforementioned filtration step of suspended water, the cleaning step described above by immersion in a 4% sodium hydroxide aqueous solution, was repeated 10 times. Then, the initial value of tensile elongation at break (tensile elongation at break before immersion) was regarded as E0, the tensile elongation value at break of the porous hollow fiber membrane after repeating the cleaning step 10 times was EX, and EX/E0×100 was calculated as "elongation retention ratio after repetition of 10-cycle cleaning" to evaluate alkali resistance.

Moreover, after the filtration step of suspended water described above, the hollow fiber membrane was immersed in a 4% sodium hydroxide aqueous solution and maintained at 40° C. for 10 days. After immersion in sodium hydroxide, filtration was carried out for 10 minutes at the same filtration pressure as when the initial amount of permeated pure water was measured, and the permeated water was collected for 2 minutes from the 8th minute to 10th minute during the filtration, which was regarded as an amount of permeated water after the cleaning step. The initial amount of permeated pure water was regarded as L0 (flux L0), the amount of permeated water after the cleaning process was L1 (flux L), and L1/L0×100 was calculated as a retention ratio of an amount of permeated water after NaOH immersion.

Moreover, after the filtration step of suspended water, the aforementioned cleaning step by immersing the hollow fiber membrane in a 4% sodium hydroxide aqueous solution, was repeated 10 times. And filtration was carried out for 10 minutes at the same filtration pressure as when measuring the initial amount of permeated pure water as described above, and the permeated water was collected for 2 minutes from 8th minute to 10th minute during the filtration, which was regarded as an amount of permeated water after the repeated cleaning steps. The initial amount of permeated pure water was L0 (flux L0), the amount of permeated water after the repeated cleaning steps was LX (flux LX, X=10), and LX/L0×100 was calculated as "retention ratio of an amount of permeated water after repetition of 10-cycle cleaning".

Moreover, after the aforementioned filtration step of suspended water (after the flux became 50% or less with respect to the initial flux L0.), the aforementioned cleaning step of immersing the hollow fiber membrane into the 4% sodium hydroxide aqueous solution and passing the solution therethrough, was carried out followed by the rinsing step of using 10 L rinse water per 1 m² of membrane area, and when carrying out the filtration again, a pH was measured, confirming that it was 9 or less.

Moreover, after the aforementioned filtration step of suspended water, the cycle in which the cleaning step and the rinsing step of using 10 L rinse water per 1 m² of membrane area were carried out followed by carrying out the filtration again, was repeated 20 times, and a flux after this cycle was defined as L'20. Then. L'20/L0×100 was calculated as "retention ratio of an amount of permeated water after repetition of 20 cycles".

The elongation E'20 after the repetition of 20 cycles was also measured, and the ratio to the initial value E0 of tensile elongation at break (tensile elongation before immersion), E'20/E0×100, was calculated as "elongation retention ratio after repetition of 20 cycles".

Example 1

Using a double-pipe spinneret, a porous hollow fiber membrane of Example 1 was obtained. A melt-kneaded product consisting of 40% by weight of a PVDF resin (KF-W#1000, manufactured by Kureha Corporation) as a thermoplastic resin, 23% by weight of fine silica powder (primary particle size: 16 nm), 32.9% by weight of bis-2-ethylhexyl adipate (DOA) as a non-solvent, and 4.1% by weight of tributyl acetylcitrate (ATBC, boiling point of 343° C.) as a poor solvent, was prepared. The temperature of the melt-kneaded mixture was about 240° C.

The obtained melt-kneaded product was extruded in a form of hollow fiber and passed through a space having a free running distance of 120 mm and then solidified in water at 30° C. to fabricate a porous hollow fiber membrane by thermally induced phase separation. The obtained hollow fiber extrudate was taken up at a speed of 5 m/minute and wound up in a skein. The taken-up two-layer hollow fiber extrudate was immersed in isopropyl alcohol to extract and remove bis-2-ethylhexyl adipate and tributyl acetylcitrate, then immersed in water for 30 minutes to subject the hollow fiber membrane to water substitution, subsequently immersed in a 20% by weight NaOH aqueous solution at 70° C. for 1 hour, and further repeatedly washed with water for extraction and removal of the fine powder silica.

Table 1 shows the blended composition, production conditions, and various performances of the obtained porous membrane of Example 1. The membrane structure produced a three-dimensional network structure. Moreover, the membrane was found to have high water permeability and high percolativity. Further, the elongation retention ratio after NaOH immersion that was chemical resistance, was 80%, and the elongation retention ratio after repetition of 10-cycle cleaning was also high. Furthermore, the retention ratio of an amount of permeated water after NaOH immersion was 99%, the retention ratio of an amount of permeated water after repetition of 10-cycle cleaning was 95%, maintaining the water permeability, and the pore widening in the hollow fiber membrane due to deterioration thereof by alkali was also not observed.

Moreover, pH values after filtration, cleaning and rinsing (10 L/m² of rinse water) were measured, confirming that the pH was 9 or less for each treatment.

Example 2

Using a double-pipe spinneret, a porous hollow fiber membrane of Example 2 was obtained. A melt-kneaded product consisting of 40% by weight of a ETFE resin (TL-081, manufactured by Asahi Glass Co., Ltd.) as a thermoplastic resin, 23% by weight of fine silica powder (primary particle size: 16 nm), 32.9% by weight of bis-2-ethylhexyl adipate (DOA) as a non-solvent, and 4.1% by weight of diisobutyl adipate (DIBA) as a poor solvent, was prepared.

The obtained melt-kneaded product was extruded in a form of hollow fiber and passed through a space having a free running distance of 120 mm and then solidified in water at 30° C. to fabricate a porous hollow fiber membrane by thermally induced phase separation. The obtained hollow fiber extrudate was taken up at a speed of 5 m/minute and wound up in a skein. The taken-up two-layer hollow fiber extrudate was immersed in isopropyl alcohol to extract and remove the solvents, then immersed in water for 30 minutes to subject the hollow fiber membrane to water substitution, subsequently immersed in a 20% by weight NaOH aqueous solution at 70° C. for 1 hour, and further repeatedly washed with water for extraction and removal of the fine powder silica.

Table 1 shows the blended composition, production conditions, and various performances of the obtained porous membrane of Example 2. The membrane structure produced a three-dimensional network structure. Moreover, the membrane was found to have high water permeability and high percolativity. Further, the elongation retention ratio after NaOH immersion that was chemical resistance, was 98%, and the elongation retention ratio after repetition of 10-cycle cleaning was also high. Furthermore, the retention ratio of an amount of permeated water after NaOH immersion was 100%, the retention ratio of an amount of permeated water after repetition of 10-cycle cleaning was 96%, capable of maintaining the water permeability, and pore widening of the hollow fiber membrane due to deterioration thereof by alkali was also not observed.

Moreover, pH values after filtration, cleaning and rinsing (10 L/m² of rinse water) were measured, confirming that the pH was 9 or less for each treatment.

Example 3

Using a double-pipe spinneret, a porous hollow fiber membrane of Example 3 was obtained. A melt-kneaded product consisting of 40% by weight of a ECTFE resin (Halar901, manufactured by Solvay Specialty Polymers Japan K. K.) as a thermoplastic resin, 23% by weight of fine silica powder (primary particle size: 16 nm), 32.9% by weight of triphenyl phosphite (TPP) as a non-solvent, and 4.1% by weight of bis-2-ethylhexyl adipate (DOA) as a poor solvent, was prepared.

The obtained melt-kneaded product was extruded in a form of hollow fiber and passed through a space having a free running distance of 120 mm and then solidified in water at 30° C. to fabricate a porous hollow fiber membrane by thermally induced phase separation. The obtained hollow fiber extrudate was taken up at a speed of 5 m/minute and wound up in a skein. The taken-up two-layer hollow fiber extrudate was immersed in isopropyl alcohol to extract and remove the solvents, then immersed in water for 30 minutes to subject the hollow fiber membrane to water substitution, subsequently immersed in a 20% by weight NaOH aqueous solution at 70° C. for 1 hour, and further repeatedly washed with water for extraction and removal of the fine powder silica.

Table 1 shows the blended composition, production conditions, and various performances of the obtained porous membrane of Example 3. The membrane structure produced a three-dimensional network structure. Moreover, the membrane was found to have high water permeability and high percolativity. Further, the elongation retention ratio after NaOH immersion that was chemical resistance, was 97%, and the elongation retention ratio after repetition of 10-cycle cleaning was also high. Furthermore, the retention ratio of an amount of permeated water after NaOH immersion was 98%, the retention ratio of an amount of permeated water after repetition of 10-cycle cleaning was 95%, capable of maintaining the water permeability, and pore widening of the hollow fiber membrane due to deterioration thereof by alkali was also not observed.

Moreover, pH values after filtration, cleaning and rinsing (10 L/m² of rinse water) were measured, confirming that the pH was 9 or less for each treatment.

Comparative Example 1

A hollow fiber membrane of Comparative Example 1 was obtained in the same manner as in Example 1 with the exception of using only ATBC as a solvent. Table 2 shows the blended composition, production conditions, and various performances of the porous membrane obtained in Comparative Example 1. The membrane structure produced a spherulite structure. Moreover, the membrane was found to have low water permeability and low percolativity. Further, the elongation retention ratio after NaOH immersion as chemical resistance, was 30%, which was a low value.

Further, pH values after filtration, cleaning, and rinsing (10 L/m² rinse water) were measured, but the pH did not become 9, and became 9 or less by the rinsing process using additional rinse water.

Comparative Example 2

A hollow fiber membrane of Comparative Example 2 was obtained in the same manner as in Example 1 with the exception of setting the amount of silica to 0% and using γ-butyrolactone alone as a solvent. Table 2 shows the blended composition, production conditions, and various performances of the porous membrane of Comparative Example 2 obtained. The membrane structure produced a spherulite structure. Moreover, the membrane was found to have low water permeability and low percolativity. Further, the elongation retention ratio after NaOH immersion as chemical resistance, was 30%, being a low value.

Further, pH values after filtration, cleaning, and rinsing (10 L/m² rinse water) were measured, but the pH did not become 9, and became 9 or less by the rinsing process using additional rinse water.

As described above, it was found that the chemical resistance varied depending on the membrane structure and that the membrane having better percolativity was more excellent in chemical resistance and had higher filtration performance.

TABLE 1

| | Example 1 | Example 2 | Example 3 |
|---|---|---|---|
| Resin | PVDF KF W#1000 40% | ETFE TL-081 40% | ECTFE Halar901 40% |
| Additive | Fine silica powder 23% | Fine silica powder 23% | Fine silica powder 23% |
| Non-solvent | DOA: 32.9% | DOA: 32.9% | TPP: 32.9% |
| Poor solvent | ATBC: 4.1% | DIBA: 4.1% | DOA: 4.1% |
| Extrusion temperature of stock solution for membrane fabrication [° C.] | 240 | 240 | 240 |
| Coagulation liquid | Water | Water | Water |
| Coagulation liquid temperature [° C.] | 30 | 30 | 30 |
| Free running distance [mm] | 120 | 120 | 120 |
| Fine pore diameter [nm] | 500 | 600 | 400 |
| Fine pore structure | 3-dimensional network | 3-dimensional network | 3-dimensional network |
| Surface opening ratio [%] | 30 | 30 | 30 |
| Water permeability [L/(m² · h)] | 4,000 | 5,000 | 3,500 |
| Outer diameter/inner diameter [mm] | 1.2/0.7 | 1.2/0.7 | 1.2/0.7 |
| Tensile elongation at break [%] | 170 | 160 | 180 |
| Elongation retention ratio after NaOH immersion [%] | 80 | 98 | 97 |
| Retention ratio of amount of permeated water after NaOH immersion [%] | 99 | 100 | 98 |
| Elongation retention ratio after repetition of 10-cycle cleaning [%] | 70 | 90 | 95 |
| Retention ratio of amount of permeated water after repetition of 10-cycle cleaning [%] | 95 | 96 | 95 |
| Proportion of resin portion with 1 μm² or less by image analysis (1) [%] | 82 | 84 | 94 |
| Proportion of resin portion with 1 μm² or less by image analysis (2) [%] | 78 | 76 | 98 |
| Proportion of resin portion with 1 μm² or less by image analysis (3) [%] | 77 | 75 | 98 |
| Proportion of resin portion with 1 μm² or less by image analysis (4) [%] | 73 | 76 | 97 |
| Proportion of resin portion with 10 μm² or more by image analysis (1) [%] | 7 | 7 | 3 |
| Proportion of resin portion with 10 μm² or more by image analysis (2) [%] | 8 | 15 | 0 |
| Proportion of resin portion with 10 μm² or more by image analysis (3) [%] | 13 | 2 | 0 |
| Proportion of resin portion with 10 μm² or more by image analysis (4) [%] | 7 | 13 | 0 |
| Retention ratio of water permeability [%] | 75 | 70 | 80 |
| Elongation retention ratio after repetition of 20 cycles | 68 | 88 | 93 |
| Retention ratio of amount of permeated water after repetition of 20 cycles | 95 | 96 | 95 |

TABLE 2

|  | Comparative Example 1 | Comparative Example 2 |
|---|---|---|
| Resin | PVDF KF W#1000 40% | PVDF KF W#1000 40% |
| Additive | Fine silica powder 23% | None |
| Non-solvent | None | None |
| Poor solvent | ATBC: 37% | γ-Butyrolactone: 60% |
| Extrusion temperature of stock solution for membrane fabrication [° C.] | 240 | 200 |
| Coagulation liquid | Water | Water |
| Coagulation liquid temperature [° C.] | 30 | 30 |
| Free running distance [mm] | 120 | 120 |
| Fine pore diameter [nm] | 200 | 100 |
| Fire pore structure | Spherulite structure | Spherulite structure |
| Surface opening ratio [%] | 20 | 20 |
| Water permeability [L/(m$^2$ · h)] | 150 | 2,000 |
| Outer diameter/inner diameter [mm] | 1.2/0.7 | 1.2/0.7 |
| Tensile elongation at break [%] | 30 | 40 |
| Elongation retention ratio after NaOH immersion [%] | 30 | 30 |
| Retention ratio of amount of permeated water after NaOH immersion [%] | 150 | 160 |
| Elongation retention ratio after repetition of 10-cycle cleaning [%] | 20 | 20 |
| Retention ratio of amount of permeated water after repetition of 10-cycle cleaning [%] | 200 | 180 |
| Proportion of resin portion with 1 μm$^2$ or less by image analysis (1) [%] | 18 | 45 |
| Proportion of resin portion with 1 μm$^2$ or less by image analysis (2) [%] | 17 | 19 |
| Proportion of resin portion with 1 μm$^2$ or less by image analysis (3) [%] | 15 | 10 |
| Proportion of resin portion with 1 μm$^2$ or less by image analysis (4) [%] | 14 | 13 |
| Proportion of resin portion with 10 μm$^2$ or more by image analysis (1) [%] | 63 | 0 |
| Proportion of resin portion with 10 μm$^2$ or more by image analysis (2) [%] | 68 | 75 |
| Proportion of resin portion with 10 μm$^2$ or more by image analysis (3) [%] | 55 | 85 |
| Proportion of resin portion with 10 μm$^2$ or more by image analysis (4) [%] | 75 | 65 |
| Retention ratio of water permeability [%] | 30 | 30 |
| Elongation retention ratio after repetition of 20 cycles | 18 | 18 |
| Retention ratio of amount of permeated water after repetition of 20 cycles | 205 | 190 |

INDUSTRIAL APPLICABILITY

According to the invention it is possible to provide a porous membrane having a favorable percolativity of fine pores for filtration operation and to provide filtration operation excellent in chemical resistance with high efficiency.

The invention claimed is:

1. A method of filtration comprising:
   a filtration in which a liquid to be filtered is filtered through a porous membrane formed from a resin, and cleaning an inside of the porous membrane after the filtration,
   wherein the porous membrane has, in all visual fields in a cross section of the inside of the membrane, an area proportion of a resin portion having an area of 0.1 μm$^2$ or more and 1 μm$^2$ or less in each of the visual fields, which is 70% or more relative to a total area of all resin portions included in each of the visual fields, and an area proportion of a resin portion having an area of more than 1 μm$^2$ and less than 10 μm$^2$ in each of the visual fields, which is 2% to 30% relative to the total area of all the resin portions included in each of the visual fields, and an area proportion of a resin portion having an area of 10 μm$^2$ or more in each of the visual fields, which is 15% or less relative to the total area of all the resin portions included in each of the visual fields, and the porous membrane is formed from a fluorine resin of a polymer selected from a group consisting of vinylidene fluoride resin (PVDF), ethylene-monochlorotrifluoroethylene copolymer (ECTFE), and ethylene-tetrafluoroethylene copolymer (ETFE), and the porous membrane is used in the cleaning comprising passing a 4% or more sodium hydroxide aqueous solution through the porous membrane,
   wherein a relationship between an elongation E0 of the porous membrane before the cleaning and an elongation E10 of the porous membrane after the cleaning is E10/E0×100≥70%, and
   wherein a relationship between a flux L0 of the porous membrane at a start of the cleaning and a flux L10 of the porous membrane after the cleaning is 105≥% L10/L0×100≥95%.

2. The method of filtration according to claim 1, wherein the porous membrane is a hollow fiber membrane.

3. The method of filtration according to claim 1, further comprising a rinsing including discharging a cleaning agent remaining inside the porous membrane after the cleaning,
   wherein the cleaning includes passing a chemical solution, containing the 4% or more sodium hydroxide aqueous solution, through the porous membrane when a flux becomes 50% or less with respect to an initial flux L0 of the porous membrane,
   the rinsing includes using 10 L or less of rinse water per 1 m$^2$ of a membrane area,
   a pH of filtered water when restarting the filtration after the rinsing is 9 or less, and
   a flux L20 after repeating 20 times the filtration, the cleaning, and the rinsing, has relationship represented by the following equation:

$$105\% \geq L20/L0 \times 100 \geq 80\%$$

with respect to the initial flux L0 of the porous membrane.

* * * * *